US010309340B2

(12) United States Patent
Boileau et al.

(10) Patent No.: US 10,309,340 B2
(45) Date of Patent: Jun. 4, 2019

(54) THRUST REVERSER OF A TURBOJET ENGINE NACELLE, COMPRISING CONTROL CYLINDERS OF MOVABLE COWLS AND A VARIABLE SECONDARY NOZZLE

(71) Applicant: AIRCELLE, Gonfreville l'Orcher (FR)

(72) Inventors: Patrick Boileau, Tournefeuille (FR); Olivier Kerbler, Antony (FR)

(73) Assignee: AIRCELLE, Gonfreville l'Orcher (FR)

( * ) Notice: Subject to any disclaimer, the term of this patent is extended or adjusted under 35 U.S.C. 154(b) by 414 days.

(21) Appl. No.: 15/281,569

(22) Filed: Sep. 30, 2016

(65) Prior Publication Data
US 2017/0016412 A1 Jan. 19, 2017

Related U.S. Application Data

(63) Continuation of application No. PCT/FR2015/050567, filed on Mar. 9, 2015.

(30) Foreign Application Priority Data

Mar. 31, 2014 (FR) ...................................... 14/52823

(51) Int. Cl.
F01D 25/24 (2006.01)
F02K 1/62 (2006.01)
(Continued)

(52) U.S. Cl.
CPC .............. F02K 1/625 (2013.01); F01D 25/24 (2013.01); F02K 1/72 (2013.01); F02K 1/763 (2013.01);
(Continued)

(58) Field of Classification Search
CPC .......... F01D 25/24; F02K 1/625; F02K 1/763; F02K 1/766; F05D 2250/90
See application file for complete search history.

(56) References Cited

U.S. PATENT DOCUMENTS 3,347,467 A * 10/1967 Carl .......................... F02K 1/04
239/265.13
3,831,493 A * 8/1974 Wanger ..................... F02K 1/12
91/520
(Continued)

FOREIGN PATENT DOCUMENTS

EP 0822327 2/1998
FR 2758161 7/1998
(Continued)

OTHER PUBLICATIONS

International Search Report for International Application PCT/FR2015/050567, dated Jun. 5, 2015.

Primary Examiner — Ninh H. Nguyen
(74) Attorney, Agent, or Firm — Burris Law, PLLC

(57) ABSTRACT

A thrust reverser of a bypass turbojet engine nacelle is disclosed, which includes movable cowls that move backwards with respect to a fixed front structure to uncover thrust reverser cascades and a variable secondary nozzle connected to the movable cowls by guide means allowing an axial sliding of the system which controls the movement of this variable secondary nozzle, wherein it includes cylinders bearing on the front structure for controlling reversal means of the displacement direction connected to the movable cowls, which move the variable secondary nozzle backwards when these cylinders output a forward stroke, as well as blocking devices which connect the secondary nozzle to the movable cowls when this nozzle is deployed.

13 Claims, 3 Drawing Sheets

(51) Int. Cl.
*F02K 1/72* (2006.01)
*F02K 1/76* (2006.01)
(52) U.S. Cl.
CPC ...... *F05D 2220/32* (2013.01); *F05D 2250/34* (2013.01)

(56) References Cited

U.S. PATENT DOCUMENTS

| | | | |
|---|---|---|---|
| 4,147,029 A | 4/1979 | Sargisson | |
| 5,794,434 A * | 8/1998 | Szupkay | F02K 1/625 239/265.29 |
| 2013/0145768 A1* | 6/2013 | Vaughan | F02K 1/68 60/771 |

FOREIGN PATENT DOCUMENTS

| | | |
|---|---|---|
| GB | 1545089 | 5/1979 |
| WO | 2012010774 | 1/2012 |

\* cited by examiner

THRUST REVERSER OF A TURBOJET ENGINE NACELLE, COMPRISING CONTROL CYLINDERS OF MOVABLE COWLS AND A VARIABLE SECONDARY NOZZLE

CROSS-REFERENCE TO RELATED APPLICATIONS

This application is a continuation of International Application No. PCT/FR2015/050567, filed on Mar. 9, 2015, which claims the benefit of FR 14/52823 filed on Mar. 31, 2014. The disclosures of the above applications are incorporated herein by reference.

FIELD

The present disclosure concerns a thrust reverser for an aircraft nacelle accommodating a turbojet engine as well as an aircraft nacelle equipped with such a thrust reverser.

BACKGROUND

The statements in this section merely provide background information related to the present disclosure and may not constitute prior art.

The driving assemblies for the aircrafts generally include a nacelle forming a generally circular outer envelope, comprising inside a turbojet engine disposed along the longitudinal axis of said nacelle. The turbojet engine accommodates the fresh air coming from the upstream or front side, and rejects from the downstream or rear side the hot gases coming from the combustion of the fuel, which give a certain thrust.

The bypass turbojet engines exhibit around this turbojet engine of the fan blades generating a significant secondary cold air flow along an annular flow path passing between the motor and the nacelle, which adds a high thrust.

Some nacelles include a thrust reverser system which closes at least partially the annular cold air flow path, and rejects the secondary flow forward in order to generate a braking thrust of the aircraft.

A known type of thrust reverser, shown in particular by the document FR-A1-2758161, includes rear movable cowls called "trans-cowls" axially sliding rearwards under the effect of cylinders by deploying flaps in the annular flow path in order to close the most part of this flow path. The flaps radially return the cold air flow outwardly by passing through the cascades uncovered by the movable cowls during their sliding, comprising blades which direct this flow forward.

Furthermore some nacelles include a rear secondary nozzle called a "Variable Fan Nozzle" (VFN), providing a variable secondary flow due to a translation movement of the control system of this nozzle which is connected to the movable cowls of the thrust reverser by guide means allowing an axial movement.

A known system for actuating the thrust reverser as well as the variable secondary nozzle, includes cylinders bearing on the fixed front structure in order to, firstly slide the secondary nozzle rearwards, then when it abuts on its guide means connected to the movable cowls of the thrust reverser, secondly to drive these movable cowls which are open rearwards.

A problem with this actuating system is that the cylinders must include a significant stroke, representing the sum of the stroke of the secondary nozzle and the movable cowls.

These cylinders are then difficult to design because of their length, to resist in particular to the bending, the buckling and the fatigue behavior.

Furthermore, the significant length of the cylinders makes their integration complicated into the front portion of the nacelle dedicated to the equipment, while avoiding the areas including risks of projections in the case of the bursting of the turbine.

SUMMARY

The present disclosure includes a thrust reverser of a bypass turbojet engine nacelle, comprising movable cowls which move backwards with respect to a fixed front structure to uncover thrust reverser cascades, as well as a variable secondary nozzle connected the movable cowls by guide means (or a guide device) allowing an axial sliding, characterized in that it includes cylinders bearing on the front structure for controlling reversal means of the displacement direction connected to the movable cowls, which move the variable secondary nozzle backwards when these cylinders output a forward stroke, as well as blocking devices which connect the secondary nozzle to the movable cowls when this nozzle is deployed.

One advantage of this thrust reverser combined with a variable secondary nozzle is that the cylinders may, firstly, by a forward stroke, implement the reversal means of the axial displacement in order to move the control system of the variable secondary nozzle backwards to the deployed position, and secondly by connecting this nozzle to the movable cowls when it is in the deployed position, by a backward stroke in order to move the movable cowls backwards.

Cylinders having a total stroke only equal to that of the movable cowls are then used, the displacement of the secondary nozzle being integrated into this same stroke by the forward movement of the cylinder. The cylinders are shorter, the design of these cylinders as well as their setting up in the nacelle are facilitated.

The thrust reverser according to the present disclosure may further include one or more of the following features, which can be combined therebetween.

Advantageously, the reversal means/device of the displacement direction comprise connecting rods (links) fastened by pivots to the movable cowls, which constitute simple means performing this reversal.

In particular, each connecting rod (link) may be fastened in a central portion by a pivot to the movable cowls, one end being connected by a hinge to the cylinder, the other end being also connected by a hinge to the secondary nozzle.

According to one form, the thrust reverser includes latches which block the ends of the connecting rods (links).

The thrust reverser may include double connecting rods (links) disposed symmetrically with respect to the axis of the cylinder, each having a pivot connected to the cowls. In this manner, the efforts applied to the reversal means/device are balanced and this also allows increasing the number of controls for the actuation of the variable secondary nozzle and thus, for example, the number of flaps of said nozzle.

According to another form, the blocking means/device has two positions which can alternately block the cowls on the fixed front structure, or block the secondary nozzle on these cowls. With one control means/device of this blocking device, a blocking of the two positions is thus alternately carried out.

In this case, the blocking devices may include a latch connected to the cowls, which sways to alternately engage a hooking means located on one side on the front structure (fixed relative position), or another hooking means/device located on the other side on the reversal means/device of the displacement direction.

Advantageously, the blocking devices include elastic means providing two stable blocking and unblocking positions. Thus these two positions are simply secured.

In this case the blocking devices may include levers connected by pivots to the cowls, including blocking means fitting on the members connected to the cylinders, a spring being compressed between these levers in order to provide the two stable blocking and unblocking positions.

The present disclosure also relates to a turbojet engine nacelle including a thrust reverser comprising any one of the preceding features.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1A:
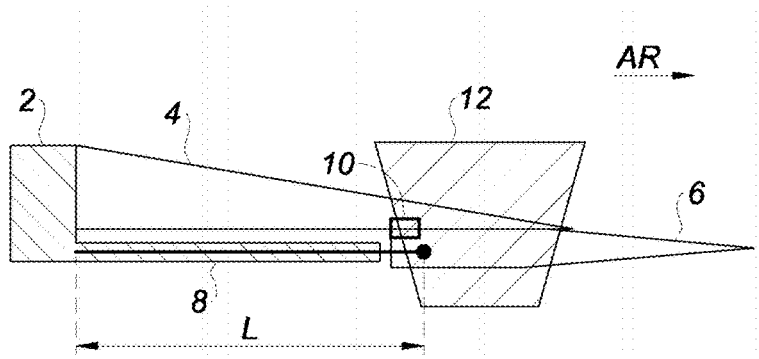
FIGS. 1a, 1b and 1c are axial sectional diagrams of a thrust reverser according to the prior art, successively shown in the closed position with the retracted then deployed secondary nozzle, and in the open position.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIG. 1a shows the rear portion of a turbojet engine nacelle, the rear axial direction being indicated by the arrow "AR," comprising a fixed front frame 2 and movable cowls 4 adjusted rearwards of this structure.

Each cowl 4 is connected to the front structure 2 by longitudinal guide means, which allow a sliding of these cowls rearwards to open the passage of the secondary flow radially outwards, through not-shown thrust reverser cascades.

Figure 1B:
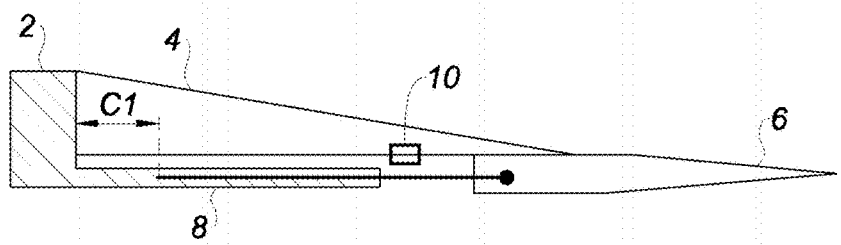

A secondary nozzle 6 disposed rearwards of the nacelle, is connected to the cowls 4 by axial guide rails allowing a retracted forward position shown in FIG. 1a, and a deployed position rearwards shown in FIG. 1b which improves the efficiencies for the high speeds of rotation of the turbojet engine.

Cylinders 8 longitudinally disposed along the cowls 4, include the front end of their body fastened to the front structure 2, and a rod extending rearwards which is fastened to the secondary nozzle 6.

Figure 1C:
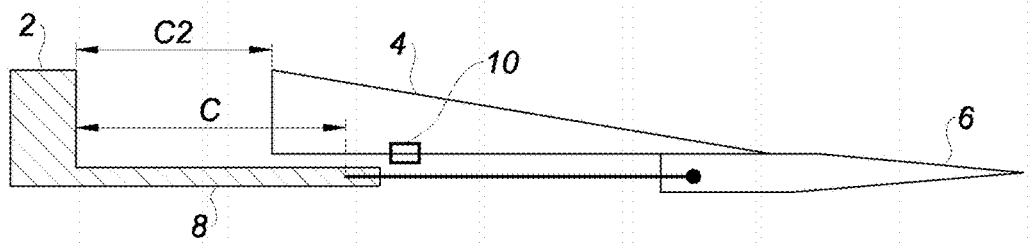

Each cylinder 8 performs, after having opened a latch 10 connecting the secondary nozzle 6 to the cowls 4, a first stroke C1 which deploys this nozzle, then when the nozzle is in the end of stroke position of its guide rails, a second stroke C2 which move the cowls 4, shown in FIG. 1c backwards. The cylinders 8 then include a total stroke C equal to the sum of two particular strokes C1 and C2.

Each cylinder 8 include, in its retracted position, a relatively large total length L necessary to perform the total stroke C imposed by the addition of two particular strokes, which raises design problems of these cylinders. Furthermore the fastening of the rod of the cylinder 8 on the secondary nozzle 6 is located in an area 12 capable of accommodating projections in the case of the bursting of the turbine, which raises safety problems.

Figure 2A:
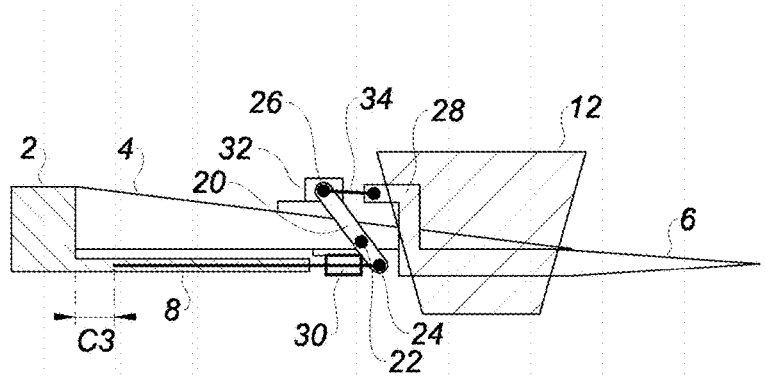
FIGS. 2a, 2b and 2c are axial sectional diagrams of a thrust reverser according to the present disclosure, successively shown in the closed position, then a deployed secondary nozzle, and then in the open position.

FIG. 2a shows a connecting rod (link) 2 fastened by a pivot 22 from its central portion to a cowl 4, the lower end 24 being connected by a hinge to the rod of the cylinder 8, and its upper end 26 being also connected by a hinge to an upper arm 28 of the secondary nozzle 6, while crossing a complementary connecting rod (link) 34.

The thrust reverser includes a first latch 32 which blocks the upper end 26 of the connecting rod (link) 20 on the cowl 4 when the secondary nozzle 6 is retracted, the upper end being in its forward position.

Figure 2B:
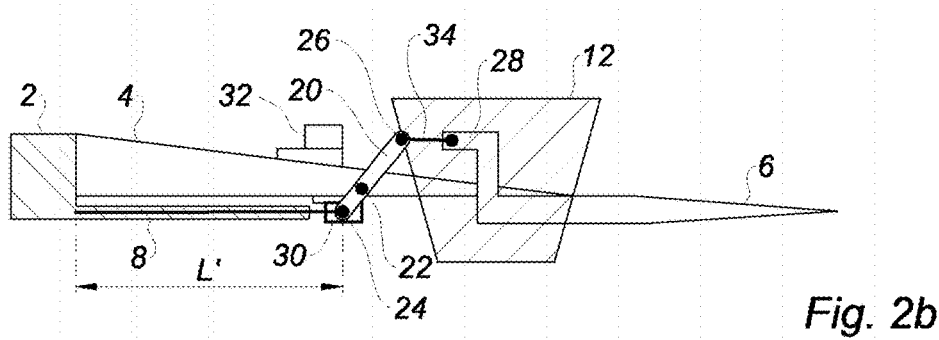

After having opened the first latch 32, the cylinder 8 performing a retraction of its rod forwards along a stroke C3, as shown in FIG. 2b, performs a swaying of the connecting rod (link) 20 about its pivot 22 which drive the secondary nozzle 6 rearwards.

It is possible, by expecting the lengths of the different connecting rods (links) 20 starting from its pivot 22, to perform a multiplication of the movement output by the cylinder 8. In particular as shown in these figures, the upper portion of the connecting rod (link) 20 being longer than its lower portion, the movement is multiplied.

Figure 2C:
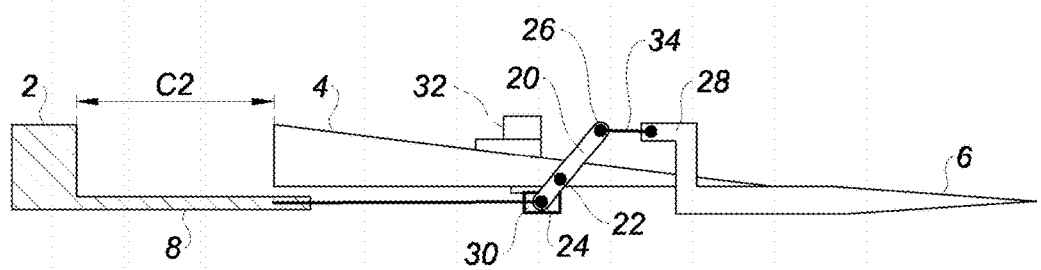

The thrust reverser includes a second latch 30 which blocks the lower end 24 of the connecting rod (link) 20 on the cowl 4, when the secondary nozzle 6 is deployed, this connecting rod (link) having its maximum inclination. It is then possible, as shown in FIG. 2c, to control an output of the rod 8 along a stroke C2, which, the connecting rod (link) 20 being blocked, drives the assembly formed by the cowl 4 and the secondary nozzle 6, to open this cowl.

Thus, a cylinder 8 having a total length L' which is shorter, having only to perform the stroke C2 for opening the cowls 4 is obtained. This cylinder 8 is easier to be housed in the nacelle, and includes less stresses for its design. Also it will be noted that the cylinder 8 does not fit into the area which may accommodate projections 12.

Figure 3A:
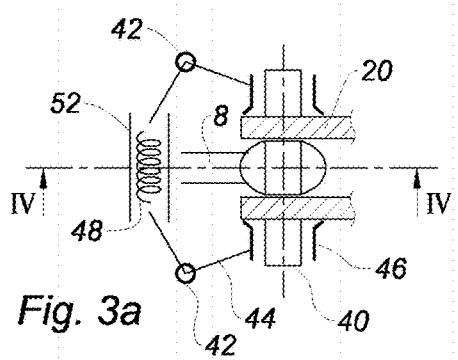
FIGS. 3a and 3b show in axial section a first example of latch, successively in the blocked and unblocked position.
Figure 3B:
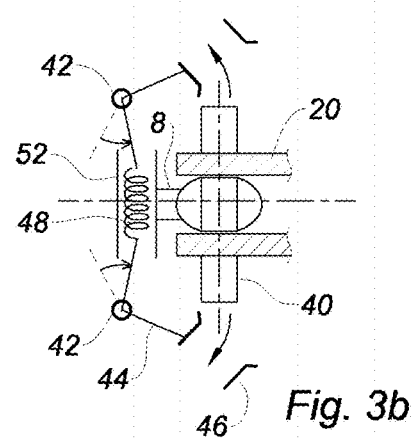
Figure 4:
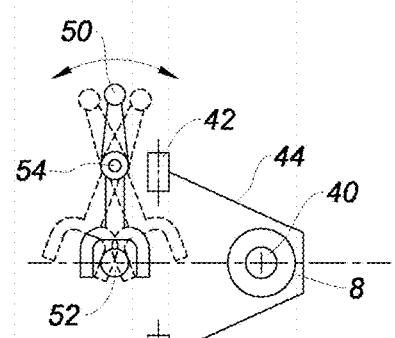
FIG. 4 shows this latch in an axial section orthogonal along the sectional plane IV-IV.

FIGS. 3a, 3b and 4 show the rod of the cylinder 8 including at its end a transverse hole accommodating an axis 40 engaged in the holes of the lower end of the connecting rod (link) 20.

The structure supporting the cowls includes symmetrically with respect to the cylinder 8, two parallel pivots 42 disposed perpendicular to the axis of this cylinder, each of which accommodates a blocking lever 44 comprising two arms forming an elbow.

The end of a first arm of each lever 44 includes a blocking ring 46 fitting on one end of the axis 40, the end of the second arm bearing on a helical compression spring 48, which is symmetrically tightened with the second arm of the other blocking lever.

A control lever 50 oscillating about a pivot 54 fastened to the structure supporting the cowls, includes its upper end actuated by a double-effect control system, and its lower end having a fork 52 accommodating the spring 48 in order to laterally guide and displace it.

By performing a switching between two positions of the control lever 50, firstly, the spring 48 is compressed, which then expands to provide two stable positions of blocking or unblocking of the latch, comprising respectively the engagement of blocking rings 46 on the axis 40 as shown in FIG. 3a, or the release of these rings as shown in FIG. 3b.

Figure 5:
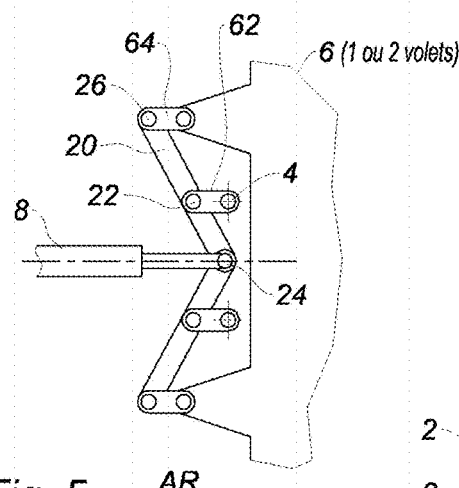
FIG. 5 shows a second example of a latch.

FIG. 5 shows a doubling of the reversal connecting rods (links) of the axial displacement, comprising two connecting rods (links) 20 disposed symmetrically with respect to the axis of the cylinder 8, each having a pivot 22 connected by a first small lever 62 to the structure supporting the cowls 4. The lower end 24 of the connecting rods (links) 20 is fastened to the rod of the cylinder 8, the upper end 22 being connected by a second small lever 64 to the secondary nozzle 6.

In this manner, an axial displacement of the rod of the cylinder 8 causes a simultaneous swaying of the two connecting rods (links) 20, the force being equally distributed between these two connecting rods (links) which decreases the maximum stresses.

Figure 6A:
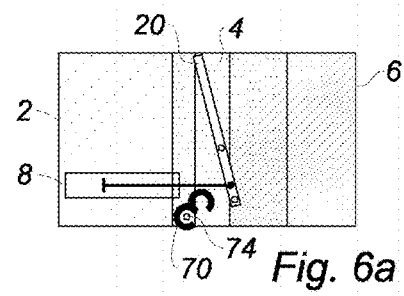
FIGS. 6a, 6b and 6c are diagrams of a third example of a latch, successively shown in the closed position, then with the deployed secondary nozzle, and then in the open position.
Figure 6B:
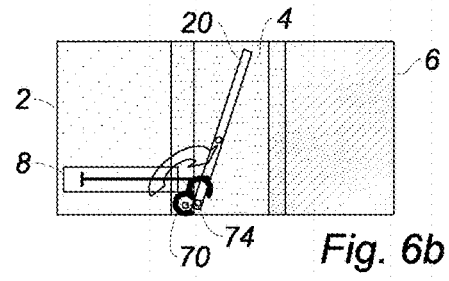
Figure 6C:
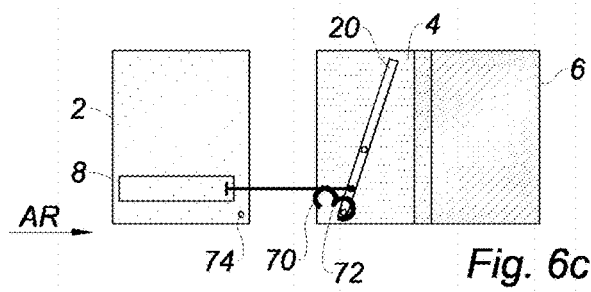

FIGS. 6a, 6b and 6c show another type of latch 70, comprising two hooks disposed symmetrically with respect to a pivot 72 fastened to the structure supporting the cowls 4.

The latch 70 may sway under the action of a double-acting control, in order to alternately engage its front hook in a blocking slug 74 disposed on the front structure 2, or its rear hook on another blocking slug disposed at the lower end of the connecting rod (link) 20.

Thus, there are obtained a blocking of the cowls 4 on the front fixed structure 2 which locks the closing of the thrust reverser, in a first position where the front hook is engaged, and a blocking of the lever 20 in its inclined position after the deployment of the secondary nozzle 6, which allows securing the cowls with this nozzle to move the assembly backwards, in the second position where the rear hook is engaged.

What is claimed is:

1. A thrust reverser of a bypass turbojet engine nacelle, comprising:
    movable cowls, the movable cowls configured to move backwards with respect to a fixed front structure to uncover thrust reverser cascades;
    a variable secondary nozzle connected to the movable cowls by a guide device, the guide device allowing an axial sliding of a control system of the variable secondary nozzle;
    cylinders bearing on the fixed front structure for controlling a reversal device connected to the movable cowls, the reversal device moving the variable secondary nozzle backwards when the cylinders output a forward stroke; and
    blocking devices that connect the variable secondary nozzle to the movable cowls when the variable secondary nozzle is deployed.

2. The thrust reverser according to claim 1, wherein the reversal device includes connecting rods fastened by pivots to the movable cowls.

3. The thrust reverser according to claim 2, wherein each connecting rod is fastened in a central portion by the pivots to the movable cowls, one end of each connecting rod being connected by a hinge to a cylinder, the other end of each connecting rod being connected by a hinge to the variable secondary nozzle.

4. The thrust reverser according to claim 2 further comprising latches that block ends of the connecting rods.

5. The thrust reverser according to claim 2 further comprising double connecting rods disposed symmetrically with respect to an axis of each cylinder, each double connecting rod having a pivot connected the movable cowls.

6. The thrust reverser according to claim 2 further comprising quadruple connecting rods disposed symmetrically with respect to an axis of each cylinder, each quadruple connecting rod having a pivot connected the movable cowls.

7. The thrust reverser according to claim 2 further comprising a plurality of connecting rods in multiples of two disposed symmetrically with respect to an axis of each cylinder, each multiple of two connecting rods having a pivot connected the movable cowls.

8. The thrust reverser according to claim 1 wherein the blocking devices have two positions which can alternately block at least one of the movable cowls on the front fixed structure and the variable secondary nozzle on the movable cowls.

9. The thrust reverser according to claim 8 wherein the blocking devices include a latch connected to the movable cowls, the latch configured to sway to alternately engage a hooking device located on one side on the fixed front structure.

10. The thrust reverser according to claim 8 wherein the blocking devices include a hooking device located on a side of the reversal device.

11. The thrust reverser according to claim 1 wherein the blocking devices include an elastic device providing two blocking and unblocking stable positions.

12. The thrust reverser according to claim 11 wherein the blocking devices include levers connected by pivots to the movable cowls, the levers including blocking members connected to the cylinders, a spring being compressed between the levers to provide the two blocking and unblocking stable positions.

13. A turbojet engine nacelle including a thrust reverser according to claim 1.

* * * * *